United States Patent [19]

Cirjak

[11] Patent Number: 4,517,063
[45] Date of Patent: May 14, 1985

[54] PHOTOCHEMICAL REACTOR AND METHOD FOR CARRYING OUT PHOTOCHEMICAL REACTIONS THEREIN

[75] Inventor: Larry M. Cirjak, Burton, Ohio

[73] Assignee: The Standard Oil Company, Cleveland, Ohio

[21] Appl. No.: 579,255

[22] Filed: Feb. 13, 1984

[51] Int. Cl.³ .............................................. B01J 19/12
[52] U.S. Cl. ........................ 204/157.1 R; 204/158 R; 204/162 R; 204/163 R; 422/186; 422/186.3
[58] Field of Search ............... 204/157.1 L, 157.1 R, 204/158 R, 162 R, 163 R; 422/186, 186.3

[56] References Cited

U.S. PATENT DOCUMENTS

| | | | |
|---|---|---|---|
| 3,127,334 | 3/1964 | Heffels | 204/157 |
| 3,271,180 | 9/1966 | White | 204/157.1 R |
| 3,314,768 | 4/1967 | Ebrey | 23/285 |
| 3,431,188 | 3/1969 | Ito et al. | 204/157.1 |
| 3,476,669 | 11/1969 | Beckmann et al. | 204/193 |
| 3,494,848 | 2/1970 | Hutson, Jr. et al. | 204/193 |
| 3,554,887 | 1/1971 | Feehs | 204/163 |
| 3,628,010 | 12/1971 | Tarkoey et al. | 250/43 |
| 3,786,250 | 1/1974 | Huhn | 250/43 |
| 3,800,159 | 3/1974 | Lucas | 250/527 |
| 3,844,915 | 10/1974 | Takamizawa et al. | 204/158 R |
| 3,993,911 | 11/1976 | Graentzel | 250/527 |
| 4,000,049 | 12/1976 | Boy et al. | 204/162 SA |
| 4,012,301 | 3/1977 | Rich et al. | 204/157.1 R |
| 4,043,886 | 8/1977 | Bierker et al. | 204/157.1 R |
| 4,087,342 | 5/1978 | Bloomfield | 204/157.1 R |
| 4,199,419 | 4/1980 | Holroyd et al. | 204/157.1 R |
| 4,252,623 | 2/1981 | Vaseen | 204/157.1 R |
| 4,277,438 | 7/1981 | Ejzak | 422/80 |

Primary Examiner—Howard S. Williams
Attorney, Agent, or Firm—Thomas P. Schur; Joseph G. Curatolo; Larry W. Evans

[57] ABSTRACT

An apparatus for carrying out a photochemical reaction incorporates a housing (11) and a lid (15), removably affixed thereto, which together define a reaction chamber (20). The lid has an axial opening (26) therein for the passage of a light beam therethrough. Means for transmitting light energy (30) within the reaction chamber (20) having a tapered end (31) optically communicating in a sealed disposition with the axial opening (26), extends into the reaction chamber (20) and terminates in a uniquely configured end (32). The light beam received by the tapered end (31) of the means for transmitting light energy (30) is controllably dispersed within the reaction chamber (20) by the uniquely configured end (32). As such, it is possible to use an external light source to activate a photochemical reaction of the reactants, and/or a photocatalyst, contained within the reaction chamber (20). Methods for carrying out photochemical reactions in the aforementioned apparatus are likewise embodied herein.

26 Claims, 5 Drawing Figures

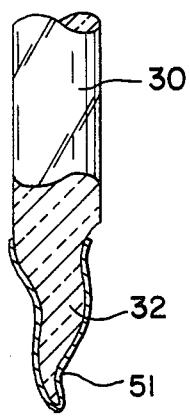
FIG. 3
FIG. 4A
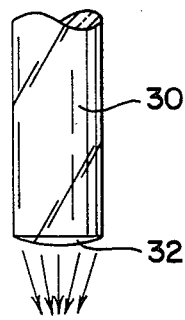
FIG. 4B
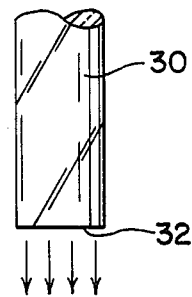

PHOTOCHEMICAL REACTOR AND METHOD FOR CARRYING OUT PHOTOCHEMICAL REACTIONS THEREIN

TECHNICAL FIELD

The present invention relates generally to a photochemical reactor for performing photochemical reactions. More particularly, the present invention relates to a photochemical reactor capable of operating at elevated temperatures and pressures. Specifically, the present invention pertains to a photochemical reactor in which the activating light source originates externally from the reaction chamber. To elaborate on this aspect, the present invention relates to a photochemical reactor having means for transmitting light energy extending from an opening in the wall of the reactor inwardly into the reaction chamber such that an external light source may be directed therethrough and dispersed within the reaction chamber in a predetermined fashion. A method for carrying out photocatalyzed reactions in the reactor is also provided.

Furthermore, the subject photochemical reactor is particularly suitable for reactions such as oxidation, disproportionation, isomerization, hydrogenation and the like, wherein it is desirable that a gaseous component of the reactant solution be introduced into the reactant chamber such that an adequate concentration of that gas is maintained dissolved in solution throughout the reaction by the utilization of elevated pressures which the subject invention is able to effect.

BACKGROUND ART

The use of photochemical techniques has generated substantial interest in the application of reacting temperature sensitive compounds. Through the use of lightsensitive reactant solutions and photocatalysts, reactions can be carried out in temperatures substantially less than those normally required for conventional thermally activated reactions and with substantially increased rates. As such it is possible to accelerate the reactions beyond those normally associated with conventional reaction techniques.

Several types of photochemical reactors are currently employed to effect the photocatalytic reactions, with varying success. One style of reactor positions a light source within a transparent receptacle extending into the reactant solution, as shown in U.S. Pat. No. 3,628,010. Such an arrangement enables the light source to be positioned in close proximity to a photocatalyst dispersed within the reactant solution. This is particularly useful when the reactant solution is light absorbing, which would otherwise reduce the quantity of light received by the photocatalyst. An inherent problem in such an arrangement, however, is that because a thin wall receptacle or tube is required to house the activating light the internal pressures within the reaction chamber must be kept at a minimum so as not to rupture the receptacle. Thus, in situations where it is preferable to conduct the photochemical reaction under a substantially increased pressure, thereby providing a greater concentration of a gaseous component in the reactant solution within the reaction chamber for a more efficient reaction, this arrangement is totally unsuitable.

An additional problem in this arrangement is found in the size limitation of the light source. Particularly, because of the restricted area available to house the light source within the receptacle, the light source is limited to a substantially small, and correspondingly expensive, configuration. Furthermore, because of its location with respect to the reaction chamber, it may be necessary to disassemble a substantial portion of the reactor to effect routine maintenance and replacement of the light source.

Another style of photochemical reactor is more suitable for operating at elevated pressures. This style of reactor employs an external light source positioned relative to a thick, pressure resistant, transparent window which permits the irradiation of the reactant solution. The inherent problem with this embodiment, however, is that if the reactant solution is light absorbing, insufficient light radiation will reach a photocatalyst dispersed therein such that the photocatalytic reaction will not occur or will occur inefficiently. This being the case, the advantageous properties of a photocatalyst are lost. Furthermore, depending upon the location of the window relative to the configuration of the reaction chamber, it may not be possible to fully irradiate the entire volume of the chamber completely. As such, a less efficient reaction would occur as compared to that normally associated with a fully irradiated chamber.

Despite the various photochemical reactors curently used in performing photochemical reactions, none embodies the desirable attributes of a light-immersion type reactor coupled with the desirable attributes of a high pressure reactor. Namely, no photochemical reactor, as yet, has enabled the photochemical reaction to take place under extremely high internal pressure, occasionally in excess of 340 atmospheres, while at the same time permitting the activating light to be introduced into the reaction chamber with means for transmitting light immersed within the reactants so as to permit the activating light to be dispersed in a controlled manner therein.

DISCLOSURE OF THE INVENTION

In general, an apparatus for carrying out a photochemical reaction according to the concept of the present invention includes an enclosed vessel defining a reaction chamber and having a wall with an opening therein. An access port permits the introduction of a reactant solution into the reaction chamber. Means for transmitting light energy from a light source external of the reaction chamber into the reaction chamber is positioned such that a first end is optically communicating, in a fluid-tight disposition, with the opening in the wall of the vessel while the second end of the means for transmitting light energy extends into the reaction chamber.

A method for carrying out a photochemical reaction in the above apparatus includes introducing a reactant solution, and optionally having a photocatalyst therein, into the reaction chamber. The first end of the means for transmitting light energy is exposed to a light source external from the reaction chamber. The light is dispersed in a preselected pattern from a second end of the means for transmitting light energy within the reaction chamber. The reactant solution is irradiated with the dispersed light within the reaction chamber.

An alternative method for carrying out a photochemical reaction in the above apparatus includes securing a photocatalyst to an end of the means for transmitting light energy within the reaction chamber. A reactant solution is introduced into the reaction chamber. The opposite end of the means for transmitting light energy is exposed to a light source external from the reaction chamber. The photocatalyst is irradiated with the light within the reaction chamber.

Preferred and alternative embodiments of a photochemical reactor incorporating the concept of the present invention are shown by way of example in the accompanying drawings without attempting to show all the various forms and modifications in which the invention might be embodied, the invention being measured by the appended claims and not by the details of the specification.

BRIEF DESCRIPTION OF THE DRAWINGS

FIG. 3 is a fragmentary cross-section of the transparent rod of FIGS. 1 and 2 depicting a photocatalyst disposed thereon; and FIGS. 4A and 4B are fragmentary views of the transparent rod of FIGS. 1 and 2 depicting alternative end configurations.

EXEMPLARY EMBODIMENTS FOR CARRYING OUT THE INVENTION

Figure 1:
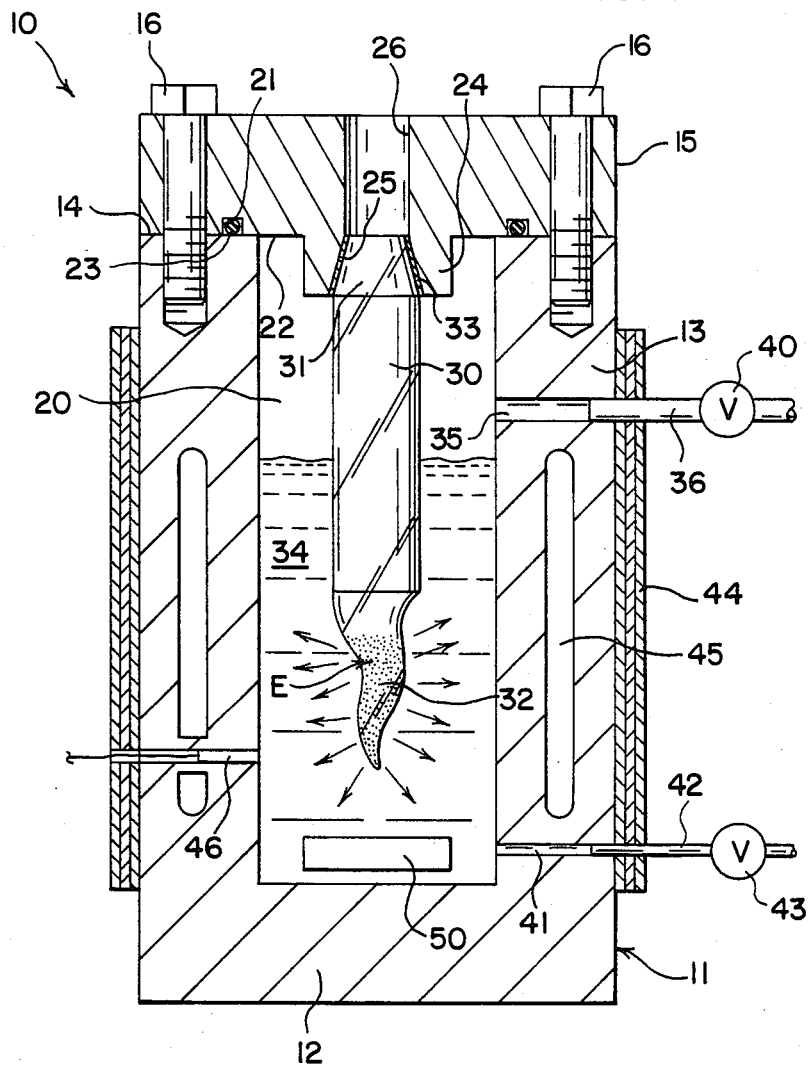
FIG. 1 is a side elevation, partially in cross-section, of a photochemical reactor embodying the concept of the present invention.

A photochemical reactor according to the concept of the present invention is indicated generally by the numeral 10 in FIG. 1 of the accompanying drawings. The photochemical reactor 10 employs a substantially cylindrical housing 11 having a base 12 and an upwardly extending annular wall 13, the latter terminating at its upmost extreme in an annular surface 14. A circular lid 15 is operatively joined to the annular surface 14 and is removably secured thereto by a plurality of retainer bolts 16 disposed equidistantly thereabout. It should be appreciated that such an association between the housing 11 and the lid 15 defines a substantially enclosed reaction chamber 20.

The housing 11 and lid 15 are preferably made from a high strength, non-magnetic, non-corrosive metal, such as stainless steel. Furthermore, the thickness of the base 12, wall 13, and lid 15 should be such as to resist safely the resulting forces associated with the high pressures, in excess of 340 atmospheres, generated during the reaction process, as would be recognized by one skilled in the art of high pressure vessels. In like manner, the number and location of the retainer bolts 16 is such as to resist these internal pressures.

An annular groove 21 is disposed about the mating surface 22 of the lid 15 at a diameter substantially larger than the inner diameter of the reaction chamber 20. As such, the annular groove 21 is suitable for positioning and retaining an O-ring 23 in sealing engagement with the annular surface 14 of the housing 11 when the lid 15 is secured thereto. An annular shoulder 24 depends from the mating surface 22 into the reaction chamber 20, substantially coaxially with the inner diameter thereof. The inner periphery of the annular shoulder 24 defines a tapered throat 25 extending convergingly from the reaction chamber 20 axially to, and terminating in, an axial opening 26 extending through the lid 15.

A transparent rod 30, preferably made from a heat resistant, optically transparent material, such as quartz or Pyrex ® glass, having a diameter substantially equal to the major diameter of the throat 25, has one end 31 tapered sufficiently to permit an interfering fit within the throat 25, and extends axially therefrom a substantial distance into the reaction chamber 20 where the rod 30 terminates in an uniquely configured end 32. A gasket 33 is interposed between the mating association of the throat 25 and the tapered end 31 of the rod 30 to permit a fluid-tight seal therebetween. The rod 30 may be secured within the throat 25 by any suitable retention means such as adhesive applied to the mating interface of the throat 25, the gasket 33, and the tapered end 31.

It should be appreciated that such an association between the lid 15 and the rod 30 enables efficient optical communication with the reaction chamber 20 while the latter is substantially fluid and air-tight. The former is accomplished as a result of the optical characteristics exhibited by the transparent rod 30. Namely, light energy received at one end of the rod 30 is transmitted axially therethrough and emitted in a predetermined pattern from the distal end thereof. As such, a light source positioned externally of the axial opening 26 is capable of effectively irradiating substantially the entire enclosed volume of the reaction chamber 20, or only so much thereof as desired. Such controlled irradiation is accomplished through the shape of the uniquely configured end 32 of the rod 30, which can be shaped to focus or diffuse the light energy as desired. Thus it should be recognized that the extent of irradiation of the reaction chamber 20 may be selectively controlled through the shape and orientation given to the uniquely configured end 32 of the rod 30.

It should also be appreciated that the use of a solid transparent rod 30, in conjunction with the tapered seal formed with the throat 25, enables pressures in excess of 340 atmospheres to be achieved within the reaction chamber 20 with minimal risk of failure of the means employed for transmitting light energy. Furthermore, because the light source is external from the reaction chamber 20, it is disassociated from the resulting forces of the internal pressures. As such, less stringent parameters are required in selection of a suitable light source.

The tapered association of the rod 30 with the throat 25 assures a fluid-tight seal to be achieved irrespective of the internal pressures within the reaction chamber. In particular, as the pressure increases within the reaction chamber 20, a net resulting axial force will cause the rod 30 to be forced tighter into the throat 25. As such, the tapered end 31 is forced against the throat 25 thereby causing a deformation of the gasket 33 in such manner as to effect the necessary sealing thereof. Accordingly, an increase in pressure within the reaction chamber 20 results in a corresponding increase in the sealing effect achieved by the tapered association of the rod 30 with the throat 25. With such an arrangement it should be appreciated that the rod 30 and throat 25 effect a seal capable of withstanding internal pressures well in excess of 340 atmospheres.

Other appurtenances to the photochemical reactor 10 may include an access port 35 extending through the reactor wall 13 and sealingly joined, at the exterior thereof, with conduit 36. A control valve 40 is operatively associated with the conduit 36 thereby enabling the reaction chamber 20 to be selectively fluidly communicating with either an inlet or outlet source, to introduce or withdraw the reactant solution 34, or with a high pressure source, to maintain the reactant solution 34 under an elevated pressure while it is within the reaction chamber 20. A capillary port 41 likewise extends through the reactor wall 13 and fluidly connects with a capillary tubing 42 and valve 43 such that sampling of the reactant solution 34 can be achieved at selective intervals during the reaction process. It should be noted that while the drawings depict the capillary port 41 as being located in the vicinity of the bottom of the reaction chamber 20, thereby being suitable for sampling of a liquid component of the reactants, other locations for the port 41 are likewise considered herein. For example, the port 41 may be located in the vicinity of the lid 15, thereby being suitable for sampling a gaseous component of the reactants. Furthermore, a plurality of ports may be employed to permit sampling of the various components of the reactants in various regions of the reaction chamber 20, throughout the reaction process.

Heating elements 44 and cooling jacket 45 may be disposed about the wall 13 of the reactor housing 11 in such fashion as to regulate the temperature of the reactant solution 34 as measured by a thermocouple 46 extending therein. The thermocouple 46 is preferably operatively associated with the heating elements 44 and cooling jacket 45 through a suitable temperature controller (not shown) such that the reactant solution 34 can accurately be maintained at a predetermined temperature. A magnetic stir bar 50, or any suitable stirring mechanism, may be employed to effect a constant circulation of the reactant solution 34 to provide a more uniform heat distribution therein and, further, to assure that the entire volume of the reactant solution 34 is sufficiently exposed to the activating light, as it radiates from the uniquely configured end 32 of the transparent rod 30, to permit activation of the photocatalyst disposed therein.

Figure 2:
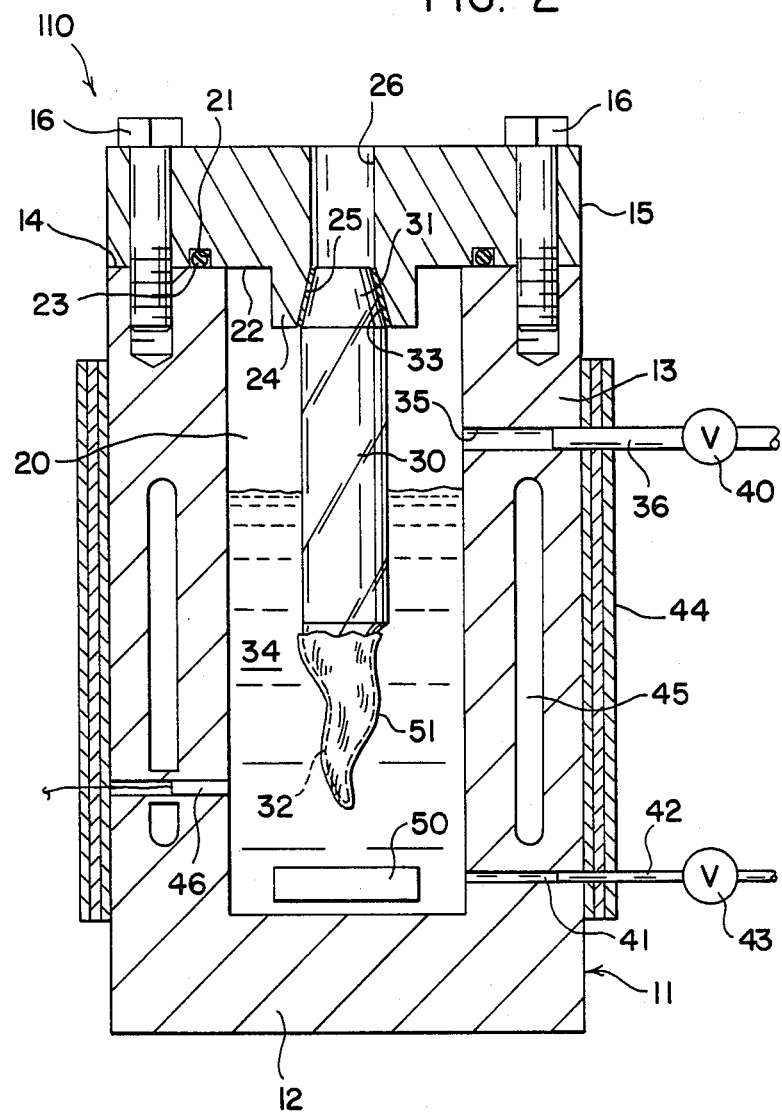
FIG. 2 is a side elevation, partially in cross-section, of an alternative configuration for a photochemical reactor embodying the concepts of the present invention.

The rod 30, in one embodiment of the invention, is of sufficient length to permit the uniquely configured end 32 to assume an immersed association with the reactant solution 34, which may be a gas or gas mixture, a liquid or liquid mixture, or a gas/liquid mixture, when the latter is within the reaction chamber 20, as depicted in FIG. 1 or FIG. 2. Such a configuration allows the influx of light through the rod 30 to be dispersed from within the reactant solution 34, thereby enabling a more efficient irradiation thereof. This is particularly true in those situations where the reactant solution 34 is light absorbent such that normal illumination on the surface thereof is incapable of illuminating the submerged regions. As such, photocatalysts found within the submerged regions of the reactant solution 34 would otherwise receive insufficient irradiation to effect the desired reaction. The immersed association of the uniquely configured end 32, on the other hand, assures that sufficient irradiation is effected within the reactant solution 34 to activate substantially all of the photocatalyst within the reaction chamber 20.

The advantages of the disclosed photochemical reactor 10, and its individual components, may be better recognized by considering the operation thereof as a member in a photochemical reaction. In particular, reference is made to a liquid phase photochemical reaction wherein the reactant solution 34 is a homogeneous light absorbing mixture containing a photocatalyst which may be either dispersed or dissolved within the reactants. As such, the uniquely configured end 32 of the transparent rod 30 is suitably positioned for immersed association with the reactant solution 34, as shown in FIG. 1.

The photochemical reactor 10 is initially charged by orienting the control valve 40 to permit the introduction of the reactant solution 34 to fill the reaction chamber 20 with a predetermined volume thereof such that the uniquely configured end 32 is completely submerged therein. The control valve 40 is then oriented to communicate the reaction chamber 20 with a high pressure source thereby effecting an initial positive pressure upon the reactant solution 34. When the desired pressure is achieved, the control valve 40 is oriented so as to effect a fluid-tight seal thereby permitting the reaction chamber 20 to represent a sealed pressure vessel.

Heating elements 44 are energized to raise the temperature of the reactant solution 34 to a predetermined reaction temperature, as measured by the thermocouple 46. Such temperature is generally not great enough to activate the reaction, nor to cause degradation of the photocatalyst or the reactants in the solution 34, but merely to permit the reactant solution 34 to approach the activation threshold. Alternately, however, the cooling jacket 45 may be energized thereby lowering the temperature of the reactant solution 34 to a predetermined reaction temperature. Such lowered temperatures have been found, in some reactions, to enable a more efficient reaction to be achieved inasmuch as a greater concentration of reactants can be obtained within the reaction chamber 20 at the lowered temperatures. To assure a uniform temperature distribution throughout the reactant solution 34, it may be desirable to effect circulatory stirring thereof. Such stirring may easily be effected through the use of a magnetic stirrer with a magnetic stir bar 50 contained within the reactant solution 34, inasmuch as the reactor housing 13 is preferably constructed of non-magnetic stainless steel.

After the reactant solution 34 has reached the desired temperature, the reactant solution can then be reacted through irradiation by a light source. Depending upon the compounds being reacted, the light source may be polychromatic or monochromatic. In either event, it should be understood that the light source is always maintained externally of the reaction chamber 20. Particularly, the light source is positioned externally of the axial opening 26 of the lid 15. The light irradiates therethrough, and is received by the tapered end 31 of the transparent rod 30. The light travels axially through the rod 30 and is controllably dispersed from the uniquely configured end 32 into the reactant solution 34. As such, a substantial amount of the light is irradiated directly to a photocatalyst contained in suspension within the reactant solution 34.

When such irradiation occurs, the desired reaction is effected and continues at a rate proportional to the amount of irradiation until substantially all of the reactants have been reacted. To assure complete reaction, the magnetic stirring is continued throughout the reaction, thereby assuring that all of the photocatalyst is exposed to the activating light.

The reaction itself may be exothermic, thereby generating a substantial amount of heat as the photo catalysts react. As such, the temperature of the reactant solution 34 will tend to increase. The increase in temperature is sensed by the thermocouple 46 and a signal may be sent to the temperature controller which will activate the cooling jacket 45 thereby removing the excess heat and maintaining the reactant solution 34 at the desired optimum temperature.

As the reaction continues, it may be desirable to sample the reactant solution 34 periodically to chart the progress of the reaction, thereby determining the time of reaction completion. Such sampling may be accomplished by opening the valve 43 in the capillary tubing 42 and withdrawing a sufficient amount of the reactant solution 34 as is necessary to conduct the desired tests. Because of the relatively small opening in the capillary tubing 42, it is possible to withdaw a desired amount of reactant solution 34 without adversely reducing the pressure within the reaction chamber 20.

A photochemical reactor 10, suitable for carrying out the aforementioned reaction, may be of any desired size and configuration depending upon the quanity of reactant solution 34 and the nature of the reaction. Furthermore, the size, location and configuration of the transparent rod 30 is likewise contingent upon the nature of the reaction. Thus, for example, while specific dimensions are not a limitation it has been found that a reaction chamber 20 having a volume of 60 ml is adequately irradiated through the use of a transparent rod 30 having a maximum diameter of approximately 10 mm and extending a substantial distance into the reactant solution such that 20 ml of 1,3-cyclohexadiene, a suitable photocatalyst, and hydrogen gas were reacted.

It is to be understood that a variety of reactions can be conducted within the reactor 10 depending upon the reactant solution 34 selected. Thus, the reactants can include a gas or mixture thereof such as the mixture of methane gas and chlorine gas necessary for forming a methyl free radical. Or they can include a liquid or mixture thereof such as 1-pentene and a photocatalyst necessary for isomerizing the 1-pentene. Or they can include a gas/liquid mixture such as the abovementioned mixture of 1,3-cyclohexadiene, a suitable photocatalyst and hydrogen gas necessary for the hydrogenation of the 1,3-cyclohexadiene. Other gas/liquid mixtures can also include oxygen or carbon monoxide as the reactant gas. Furthermore, depending upon the physical states of the reactants and the type of photocatalyst optionally present, the dimension, orientation and shape of the transparent rod 30 may be varied so as to provide a most efficient irradiation and reaction as desired.

It should be appreciated that inasmuch as the photochemical reaction taking place within the reactor 10 is a function of the amount of reactant solution, photons of light received, and time, the reaction may be varied accordingly by varying these parameters. Particularly, for a fixed amount of reactant solution 34, the time lapse for the reaction to be completed can be reduced by increasing the amount of photons received by the reactant solution 34. Such increase in photon reception may be accomplished by increasing the power output of the light source directed through the transparent rod 30 or by increasing the number, or size, of transparent rods through which the activating light may travel. In like manner, an increase in the amount of reactant solution 34 coupled with a corresponding increase of photon reception, effected as described above, may result in virtually no substantial increase in the reaction time necessary for complete reaction.

The foregoing advantages and characteristics, while described in conjunction with a liquid phase reaction, are likewise associated with at least one alternative embodiment depicted in FIG. 2. The reactor 110 of FIG. 2 is substantially the same as the reactor 10 described hereinabove but has been presented separately for the instance where the catalyst is not dispersed or dissolved within the reactants. Some reactions may also be entirely gas phase in which instance the catalyst will likely be separate therefrom as a solid phase material.

By forming a catalyst paste 51 and applying it directly to the end 32 of the transparent rod 30, the full influx of light transmitted by the rod 30 can be received by the photocatalyst.

Considering gas phase reactions further, the reactor 10/110 of the present invention can also be employed in free radical reactions, such as the chlorination of methane, which do not require any catalyst but are instead light activated. As will be readily appreciated by those skilled in the art, the reactants chlorine and methane are fed into the reaction chamber 20, and light energy is passed through the rod 30 to initiate the reaction rather than to activate a photocatalyst.

Furthermore, the photocatalyst paste 51 is desirable for use in any reaction wherein the reactant solution 34 is a non-homogeneous and/or highly light absorbent mixture wherein the photocatalyst is not contained within the reactant solution 34, or, if so contained, receives insufficient light to fully activate all of the photocatalyst therein. In these situations, the photocatalyst paste 51 is likewise secured directly onto the uniquely configured end 32 of the transparent rod 30, as depicted in FIG. 3, wherein it is exposed to the full influx of activating light thereby permitting efficient and complete activation of the photocatalyst in reaction with the reactants.

In each of the foregoing embodiments, it should be recognized that a wide variety of light sources may be employed to activate the photochemical reaction. Because the light source is generated externally from the reactor, no critical size limitations are imposed. Furthermore, maintenance and replacement of the light source can be accomplished without disassembly of the reactor or otherwise disturbing the reactant solution 34 contained therein. In addition it should be realized that, depending upon the particular reaction being carried out, either monochromatic, such as an argon ion laser, or polychromatic light, such as a high pressure mercury vapor lamp, may be employed without the need of varying the physical structure of the reactor.

Furthermore, in each of the foregoing embodiments, it should be recognized that the extent of irradiation within the reaction chamber 20 is controlled primarily by the configuration of the uniquely configured end 32 of the transparent rod 30. The shaping and treating of transparent rods to give desired light transmission and dispersion characteristics is well known in the art of optics. As such, although FIGS. 1–3 depict the uniquely configured end 32 as having a tapered, serpentine configuration, this is but only one of the contemplated embodiments. It should be appreciated that the instant invention contemplates a wide variety of configurations for the uniquely configured end 32. With reference to FIG. 4, two exemplary configurations are depicted, each achieving a specific irradiation pattern. Particularly, FIG. 4A concentrates and focuses the light energy to a specific point and, FIG. 4B effects a uniform axial emittance of the light energy in a substantially uniform beam. Thus, while the physical contour of the transparent rod 30 may vary, the ultimate effect remains the same, namely, the controlled dispersion of irradiating light energy within the reaction chamber 20.

In addition to the various shapes into which the uniquely configured end 32 may be formed, the surface thereof may likewise vary thereby affecting the dispersion pattern of the light energy. For instance, as shown in FIG. 1, the surface of the uniquely configured end 32 may contain a frosting or etehing E. Such surface texture permits a more efficient dispersion of the light within the reactant solution 34.

While the foregoing disclosure is directed primarily to a batch-type reactor, suitable for reacting a fixed quantity of substance, the advantages discussed herein are equally applicable to continual flow reactions. Particularly, specific inlet and outlet ports, for the introduction and removal of a reaction solution flow, may be suitably located about the walls of the reactor 10 to permit a continuous controlled flow of the reaction solution through the reaction chamber 20 such that the entire mass flow will pass within the exposure limits of the uniquely configured end 32. Such continuous flow will create its own circulatory action thereby obviating the need for a mechanical stirring device. Furthermore, a continual flow reactor, as contemplated herein, should permit more efficient and economically feasible reactions to be carried out in a manner heretofore unavailable in the art.

Thus, in view of the foregoing disclosure, it should be evident that a photochemical reactor embodying the concept of the invention disclosed herein enables the activating light energy to be dispersed in a controlled manner from an immersed association within the reactant solution. Furthermore, the disclosed invention permits the use of a light source external of the reaction chamber to irradiate the latter thereby enabling a wide variety of light sources to be employed and, further, allowing the reactor to be easily disassembled for maintenance and repair. As such, the foregoing invention constitutes an advantageous contribution to the art.

I claim:

1. An apparatus for carrying out a photochemical reaction comprising:
   an enclosed vessel defining a reaction chamber and having a wall with an opening therein;
   means for introducing a reactant solution into said reaction chamber; and
   means for transmitting light energy from a source external of said reaction chamber into said reaction chamber said means having a first end optically communicating, in a fluid-tight disposition, with the opening in said wall of said pressure vessel, and a second end disposed in said reaction chamber.

2. Apparatus according to claim 1, further comprising means for regulating the temperature within said reaction chamber.

3. Apparatus according to claim 1, wherein said second end of said means for transmitting light energy is suitably configured for the preselected dispersion of a light beam within said reaction chamber.

4. Apparatus according to claim 3, wherein said second end of said means for transmitting light energy is adapted to be immersed within the reactant solution.

5. Apparatus according to claim 1, wherein said means for transmitting light energy is at least one transparent quartz rod.

6. Apparatus according to claim 1, wherein said means for transmitting light energy is at least one heat resistant glass rod.

7. Apparatus according to claim 1, wherein said second end of said means for transmitting light energy is suitably configured for the acceptance and retention of a photocatalyst placed thereon.

8. A method for carrying out a photochemical reaction in a reaction chamber having means extending substantially into said reaction chamber for transmitting light energy from a source external thereof into said reaction chamber, comprising the steps of:
   introducing a reactant solution into said reaction chamber;
   exposing a first end of said means for transmitting light energy to a light source;
   dispersing light from a second end of said means for transmitting light energy within said reaction chamber; and,
   irradiating said reactant solution with said dispersed light within the reaction chamber thereby enabling reaction of said reactant solution to occur.

9. A method, as set forth in claim 8, comprising the further step of:
   regulating the temperature of said reactant solution within the reaction chamber.

10. A method, as set forth in claim 8, comprising the further step of:
    regulating the pressure within the reaction chamber.

11. A method, as set forth in claim 8, further comprising the step of immersing the second end of the means for transmitting light energy within said reactant solution.

12. A method, as set forth in claim 8, wherein the light is dispersed from the second end of said means for transmitting light energy in a preselected pattern.

13. A method, as set forth in claim 12, wherein said preselected pattern is a broad diffusion pattern of the light.

14. A method, as set forth in claim 12, wherein said preselected pattern is concentrated and focused to a specific point.

15. A method, as set forth in claim 12, wherein said preselected pattern is a substantially uniform beam.

16. A method, as set forth in claim 8, wherein said reactant solution contains a photocatalyst.

17. A method, as set forth in claim 16, comprising the further step of:
    regulating the temperature of said reactant solution within the reaction chamber.

18. A method, as set forth in claim 16, comprising the further step of:
    regulating the pressure within the reaction chamber.

19. A method, as set forth in claim 16, further comprising the step of immersing the second end of the means for transmitting light energy within said reactant solution.

20. A method, as set forth in claim 16, wherein the light is dispersed from the second end of said means for transmitting light energy in a preselected pattern.

21. A method, as set forth in claim 20, wherein said preselected pattern is a broad diffusion pattern of the light.

22. A method, as set forth in claim 20, wherein said preselected pattern is concentrated and focused to a specific point.

23. A method, as set forth in claim 20, wherein said preselected pattern is a substantially uniform beam.

24. A method for carrying out a photochemical reaction in a reaction chamber having means extending substantially into said reactor chamber for transmitting light energy from a source external thereof into said reaction chamber, comprising the steps of:
    securing a photocatalyst to an end of said means for transmitting light energy within the reaction chamber;
    introducing a reactant solution into said reaction chamber;

exposing the opposite end of said means for transmitting light energy to a light source; and irradiating said photocatalyst with said light within the reaction chamber thereby enabling catalysis of said reactant solution to occur.

25. A method, as set forth in claim 24, comprising the further step of:
   regulating the temperature of said reactant solution within the reaction chamber.

26. A method, as set forth in claim 24, comprising the further step of:
   regulating the pressure within the reaction chamber.

* * * * *